United States Patent Office

3,348,918
Patented Oct. 24, 1967

---

3,348,918
DIAMOND PURIFICATION
Jurgen M. Kruse, Pitman, N.J., assignor to E. I. du Pont de Nemours and Company, Wilmington, Del., a corporation of Delaware
No Drawing. Filed Nov. 21, 1966, Ser. No. 595,654
6 Claims. (Cl. 23—209.9)

ABSTRACT OF THE DISCLOSURE

A process for removing carbon from carbon-diamond mixtures by selective oxidation with molecular oxygen in the presence of a lead oxide catalyst. The term "carbon" is intended to include all of the elemental, non-diamond forms of carbon, e.g., graphite, carbon black, charcoal, coke, etc.

RELATED APPLICATION

This application is a continuation-in-part of my copending application Ser. No. 373,109, filed June 5, 1964, now abandoned.

BACKGROUND OF THE INVENTION

Synthesis of diamond from carbon is an important technical achievement of relatively recent times. Various methods of effecting this synthesis are described in U.S. Patents 2,947,609, 2,947,610 and 3,238,019, and in copending, coassigned application Ser. No. 602,445, filed Nov. 21, 1966. Recovery of the diamond thus obtained from its admixture with unreacted carbon is complicated by two major problems: (1) the conditions required to convert carbon to an easily removable product will often attack the diamond, and (2) the synthesized diamond often is of such an extremely small particle size, e.g., as small as about one micron, that its loss during certain types of handling procedures is considerable.

DESCRIPTION OF THE INVENTION

It now has been found that the above problems are overcome, and the carbon in a mixture of carbon and diamond powders is oxidized selectively, i.e., the diamond remains substantially unattacked, by a process which comprises contacting the carbon-diamond powder mixture with a lead oxide catalyst and molecular oxygen at a temperature within the range of about 250° C. to about 500° C. This method of oxidation offers the advantage that the carbon is oxidized to gaseous carbon dioxide, which escapes from the mixture, thus leaving only the catalyst to be separated from the diamond values.

The process of the present invention employs a combination of conditions uniquely suited to the carbon-diamond system. One of the important features of this process is the presence of a lead oxide catalyst in contact with the mixture of carbon and diamond powders. The catalyst can be any oxide of lead, e.g., PbO, $PbO_2$, $Pb_2O_3$, or $Pb_3O_4$, or a mixture of such oxides and the expression "a lead oxide" is intended to include all such compounds. The catalyst should be uniformly dispersed through the carbon-diamond powder mixture; therefore, the oxide, or an oxygen-containing compound of lead which will be transformed in situ to an oxide of lead at the reaction temperature or below, e.g., lead carbonate, hydroxide, nitrate, subacetate, etc., is homogeneously mixed with the powder mixture either by hand or mechanically. The particle size of the lead compound should be no greater than about 1 millimeter, and preferably no greater than about 50 microns, to assure sufficient contact with the carbon.

The amount of catalyst necessary to achieve effective results varies depending on such factors as the heating time, temperature, and relative proportions of carbon and diamond in the mixture. In general, the requisite amount of catalyst increases with decreasing reaction time, decreasing reaction temperature, or increasing proportions of carbon in the carbon-diamond mixture. Usually, sufficient lead oxide or other lead compound will be employed to assure that total lead oxide (i.e., total catalyst) present at reaction temperature will be at least about 5% of the weight of the carbon-diamond mixture. While the catalyst can be used in amounts such that it is the major component of the mixture, it is generally preferred that it be from about 10% to about 50% by weight of the carbon-diamond mixture, both on the basis of satisfactory reaction rate and freedom from inordinately large amounts of catalyst to be subsequently separated from the diamond.

The present process can be employed with all carbon-diamond mixtures, irrespective of the type of carbon present or the relative proportions of carbon and diamond, since neither of these factors has a critical effect on the selective oxidation. Further, the mixture can contain other components, such as those which may have been formed during the diamond synthesis process. Chromium ion should not be present, however, since it catalyzes the graphitization of diamond under the conditions of the present process.

In order to assure good contact between the carbon and lead oxide, the size of the carbon particles therein should be no greater than about 1 millimeter, and preferably no greater than about 200 microns.

The mixture of carbon, diamond, and a lead oxide (or oxygen-containing lead compound which will be transformed to a lead oxide at reaction temperature or below) is heated with a gas containing molecular oxygen at a temperature within the range of about from 250 to 500° C.

The oxidizing gas can be air or any other mixture containing molecular oxygen, or it can be pure oxygen itself. Preferably, the amount of oxygen is maintained in excess of stoichiometric requirements for conversion of carbon to carbon dioxide. On an economical basis, air is preferred, and the mixture can simply be heated in air at the desired temperature.

When the oxidizing gas is air, oxidation of diamond becomes marked at temperatures above about 500° C.; and to avoid diamond losses in air, the process preferably is effected at a temperature no higher than about 430° C., although higher temperatures can be used with satisfactory results provided short reaction times are employed. To obtain reasonably acceptable reaction rates in air, a temperature of at least about 350° C., and preferably at least about 380° C., is employed. On the other hand, when pure oxygen is the oxidizing gas, oxidation of carbon begins at about 250° C. and significant oxidation of the diamond begins at about 450° C. Accordingly, temperatures of about from 325 to 430° C. are preferred when oxygen, as opposed to air, is used. At temperatures within the preferred ranges of about from 380° C. to 430° C. (air), and about from 325 to 430° C. (oxygen), reaction times of about 12 hours or more are employed. Static conditions require more time or higher temperatures than conditions wherein mixing or swirling is used.

After oxidation of the carbon is complete, diamond is recovered from the remaining mixture of diamond and lead oxide by selectively dissolving the lead oxide and separating the resulting liquid from the diamond. Aqueous solution of acids such as nitric, acetic, hydrochloric, citric, and ethylenediaminetetraacetic acids can be used for this purpose, nitric and acetic acids and aqua regia being preferred on an economical basis. If any other components are present in the mixture, they can be removed together with the lead oxide or in a subsequent step.

The following examples illustrate the process of the invention.

Example 1

(A) The following powders are mixed by shaking them together with steel balls:

(1) Spectrographic-grade artificial graphite (less than 6 parts per million total impurities) of a particle size such as to pass a 325-mesh screen (openings: 44 microns), in the amount of 39.6 grams;
(2) One-micron-size natural diamond (0.4 grams); and
(3) PbO (yellow) of a particle size such as to pass a 325-mesh screen, in the amount of 5.20 grams.

The powder mixture is heated for 24 hours in a flat tray (powder depth: ⅜ inch) in a 425° C. furnace having a loosely fitting door to permit the circulation of air therein. The mixture then is mixed with 200 milliliters of 99.7% acetic acid, the liquid decanted off, and the solids washed with 1000 milliliters of distilled water. The washed solids are then mixed with 50 milliliters of 36% hydrochloric acid, the liquid decanted off, and the solids washed with 1000 milliliters of distilled water, and dried to constant weight, i.e., 0.69 gram. X-ray diffraction analysis of the product indicates the presence of only diamond and graphite, the greater part being diamond.

(B) The procedure of Part A is repeated with the exception that 2 grams of graphite, 2 grams of diamond, and 2 grams of PbO are used. A product (2.84 grams) shown by X-ray diffraction to be chiefly diamond and the remainder graphite is obtained.

(C) The procedure of Part A is repeated with the exception that 38 grams of graphite, 2 grams of diamond, and 5.20 grams of PbO are used. The product (2.33 grams) is shown by X-ray diffraction to be chiefly diamond and the remainder graphite.

(D) The products from Parts A, B, and C are combined and mixed with 2.5 grams of PbO (yellow). The powder mixture is heated as described in Part A for 65 hours, after which it is treated with acid, washed, and dried as described in Part A. The product consists of 4.11 grams of diamond; no graphite is detected.

Example 2

One pound of graphite-diamond powder mixture is prepared by explosively shocking cast iron, dissolving the iron with weak aqueous $HNO_3$, treating the remaining solids, first with aqua regia to remove residual metals and then with hydrofluoric acid to remove sand, followed by washing with water and drying, as described in the aforementioned concurrently filed application Ser. No. 602,445. To this mixture is added 0.25 pound of lead oxide catalyst ($Pb_3O_4$), and the resulting mixture is ball milled for about one hour to ensure intimate contact between the graphite and $Pb_3O_4$. The resulting mixture is spread on a tray to form a layer about ⅛ inch thick, and the tray is inserted in an oven heated to 420° C. and through which air flows at a rate of about 10 liters per minute. After these conditions have been maintained for 24 hours, the oven is allowed to cool and the tray is removed. The mixture then is treated with 1100 milliliters of 95° C. aqua regia (a 4:1 mixture of 37% HCl and 60% $HNO_3$) for about one hour to convert the catalyst to chlorides and nitrates, the resulting slurry is centrifuged while hot, and the spent acid is decanted off. The solids are washed with hot water (~40° C.) until the pH rises to 4, and then treated at 25° C. with 680 milliliters of aqueous tetrasodium ethylenediaminetetraacetate (38% solution) for one hour to dissolve the lead chlorides. The product is centrifuged to collect the solids, which are washed and treated with 52% aqueous hydrofluoric acid to remove any remaining sand. The product is centrifuged to collect the solids (diamond), which are washed and dried. The resulting diamond (0.2 pound) contains less than 0.2% graphite.

Example 3

A one-pound mixture of carbon and diamond particles prepared by explosively shocking a mixture of acetylene black and steel shot and then isolating the carbon-diamond mixture, as described in the aforementioned concurrently filed application Ser. No. 602,445, is treated by the procedure described in Example 2, except the air oxidation step lasts for 36 hours. The resulting product (0.18 pound) is substantially pure diamond.

When Examples 1 to 3 are repeated using pure oxygen instead of air and an oxidation temperature of 400° C., substantially identical results are obtained.

I claim:
1. A process for selectively oxidizing the carbon in a carbon-diamond powder mixture which comprises contacting said mixture with a lead oxide and molecular oxygen at a temperature within the range of about from 250 to 500° C.
2. A process of claim 1 wherein said lead oxide is prepared in situ.
3. A process of claim 1 wherein said molecular oxygen is provided by air, and the temperature is at least about 350° C.
4. A process of claim 3 wherein the temperature is about from 380 to 430° C. and is maintained for a period of at least about 12 hours.
5. A process of claim 4 wherein the carbon is graphite.
6. A process for recovering diamond from a carbon-diamond powder mixture which comprises
    (a) contacting said mixture with a lead oxide and air at a temperature of about from 380 to 430° C.; and
    (b) thereafter selectively dissolving said lead oxide and separating the resulting solution from the solid matter remaining therein.

References Cited

UNITED STATES PATENTS 3,030,187    4/1962    Eversole _____ 23—209.1 X

OTHER REFERENCES

Phinney: "Science," vol. 120, No. 3107, July 16, 1954, page 114.

OSCAR R. VERTIZ, *Primary Examiner.*

EDWARD J. MEROS, *Assistant Examiner.*